(12) United States Patent
Buchner

(10) Patent No.: US 7,048,386 B2
(45) Date of Patent: *May 23, 2006

(54) INTERACTIVE AUDIO-VISUAL SYSTEM

(75) Inventor: Georges Buchner, Paris (FR)

(73) Assignee: France Telecom, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/380,684

(22) PCT Filed: Sep. 14, 2001

(86) PCT No.: PCT/FR01/02874

§ 371 (c)(1),
(2), (4) Date: Oct. 6, 2003

(87) PCT Pub. No.: WO02/23902

PCT Pub. Date: Mar. 21, 2002

(65) Prior Publication Data

US 2005/0099605 A1    May 12, 2005

(30) Foreign Application Priority Data

Sep. 15, 2000    (FR) .................................. 00 11773

(51) Int. Cl.
*G03B 21/28*    (2006.01)
*H04N 7/14*    (2006.01)

(52) U.S. Cl. ........................... 353/98; 353/99; 353/28; 348/14.07; 348/14.08; 348/14.16

(58) Field of Classification Search .................. 352/61, 352/65, 93, 94; 353/10, 28, 37, 69, 70, 98, 353/99, 121, 122; 348/14.01, 14.16, 14.07, 348/14.08, 14.09, 211.12, 211.13; 396/20–23, 396/12, 10, 9, 429–432, 725–732, 470–473, 396/479; 345/2.1, 2.2, 3.1

See application file for complete search history.

(56) References Cited

U.S. PATENT DOCUMENTS

| | | | | |
|---|---|---|---|---|
| 3,807,849 A | * | 4/1974 | Lobb | 353/98 |
| 5,272,526 A | * | 12/1993 | Yoneta et al. | 348/14.1 |
| 5,532,737 A | * | 7/1996 | Braun | 348/36 |
| 6,042,235 A | * | 3/2000 | Machtig et al. | 353/28 |
| 6,062,693 A | * | 5/2000 | Sato | 353/7 |
| 6,275,251 B1 | * | 8/2001 | Hartman et al. | 348/14.01 |
| 6,324,016 B1 | * | 11/2001 | Luster | 359/663 |
| 6,409,354 B1 | * | 6/2002 | Richard | 359/883 |
| 6,507,357 B1 | * | 1/2003 | Hillis et al. | 348/14.16 |
| 6,583,808 B1 | * | 6/2003 | Boulanger et al. | 348/14.09 |
| 2004/0095460 A1 | * | 5/2004 | Buchner et al. | 348/14.01 |
| 2005/0018040 A1 | * | 1/2005 | Buchner et al. | 348/14.08 |

* cited by examiner

Primary Examiner—W. B. Perkey
Assistant Examiner—Andrew Sever
(74) Attorney, Agent, or Firm—Wolf, Greenfield & Sacks, P.C.

(57) ABSTRACT

The invention concerns an interactive audio-visual system between a local scene and a remote scene, comprising at least a device (1) for producing images of the local scene and a device (2) for reproducing the image of the remote scene in an image plane (1). The image sensing device (1) comprises at least a camera (12) and a mirror (11) capable of reflecting on said camera (12) the parallel rays derived from the local scene and perpendicular to the image plane (1). Preferably, the mirror (11) is concave and has a focal point and the camera (12) is located in the proximity of the focal point of said mirror (11).

16 Claims, 7 Drawing Sheets

PRIOR ART

INTERACTIVE AUDIO-VISUAL SYSTEM

The invention concerns an interactive audiovisual system between a local scene and a remote scene, comprising at least one filming device for the local scene and a device for reproducing the image of the remote scene destined to the local scene.

The field of the invention is that of telepresence, permitting a local scene and a remote scene to be presented.

When one or more persons are part of local and remote scenes, then the term videoconference is used to allow these people to meet at a distance.

Telepresence is an extension of the videoconference.

The telepresence, like the videoconference, is obtained via the intermediary of the transmission of the image, sound and even data representing texts, graphs, slides, etc.

Even though a scene may take place outdoors, it generally takes place in a building. This is why we will designate by the term local room the place where the local scene will take place and remote room the place where the remote scene will take place.

Figure 1:
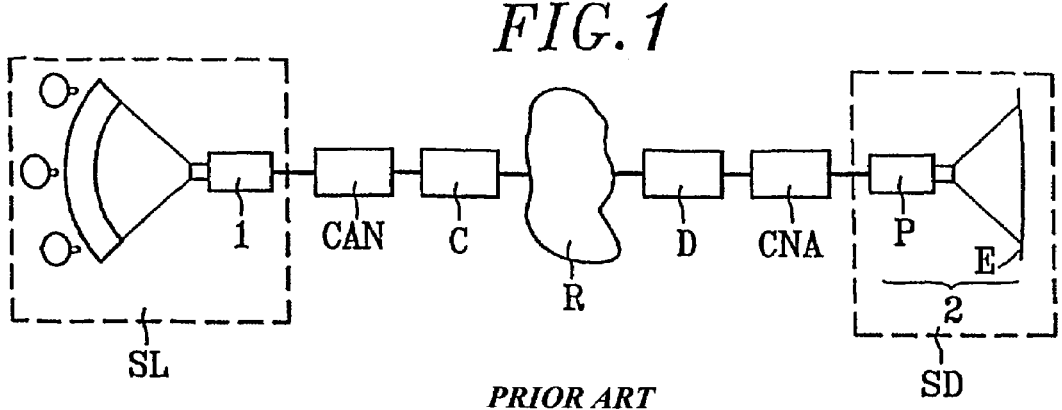

The transmission of the image of a local room SL disposing of a filming device 1 to a remote room SD disposing of a reproduction device follows a path schematically represented in FIG. 1, comprising a filming device 1 such as a camera, possibly an analogue to digital converter CAN, a coding system C, a transmission network R, a decoding system D, possibly a digital to analogue converter CNA, and an image reproduction device 2 such as a projector P linked to a plasma screen, a LCD, a CRT, etc.

In order to have mutual communication the chain shown in FIG. 1 is reproduced inversely in the remote room SD where the filming takes place that is sent to the local room SL where the reproduction takes place.

Each room is finally equipped with both a filming device and a reproduction device.

Later hereafter we will designate by the term interactive audiovisual system, a system located in a room that comprises at least a filming device and a reproduction device.

Among the interactive audiovisual systems, the videoconferencing systems are known. These videoconferencing systems are available in different forms: videoconferencing rooms, personal computer videophone communicating multimedia, interactive terminals, etc.

These systems are intended to be used at a certain distance, both as concerns the filming and the reproduction, depending on the size of the image and the use that is made of it.

Close viewing is a predominant factor to ensure that those participating in the videoconference or telemeeting viewing comfort and user-friendliness, which guarantees the effect of telepresence. This close viewing especially permits the impression of proximity between the remote participants to be enhanced by helping eye contact.

However the closer the scene to be filmed is close to the camera, the wider the camera angle needs to be. The widening of this angle when filming close-up poses a problem as illustrated in FIGS. 2a and 2b.

Figure 2A:
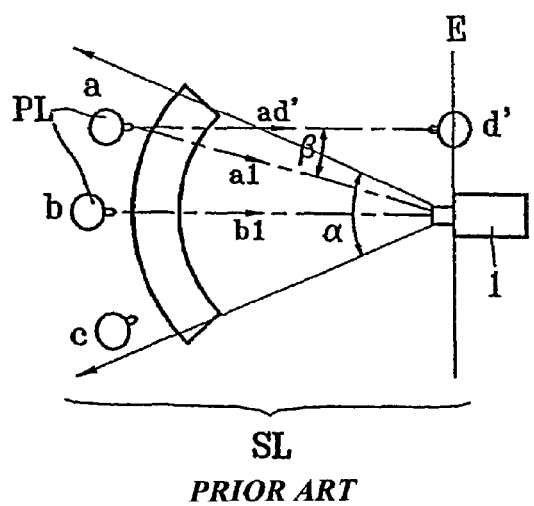

FIG. 2a shows schematically an elevation view of a filming device 1, located in a local room SL, filming a local scene, represented by the local participants PL sat around a table positioned for example at around 1 m from the camera disposing of a large field angle $\alpha$. The direction in which the participants are looking is indicated by the small loop that is supposed to represent the participant's nose. On a screen E, the image of the remote participants PD is formed, in particular the image of the remote participant d.

In the local room SL, when a local participant a who is not in line with the camera represented by the beam b1 talks to a remote participant, he looks at the image d' of this remote participant on the screen E. Even though a looks directly at d' along the beam ad', the camera receives the beam a1 and finally films the participant from the side profile.

Figure 2B:
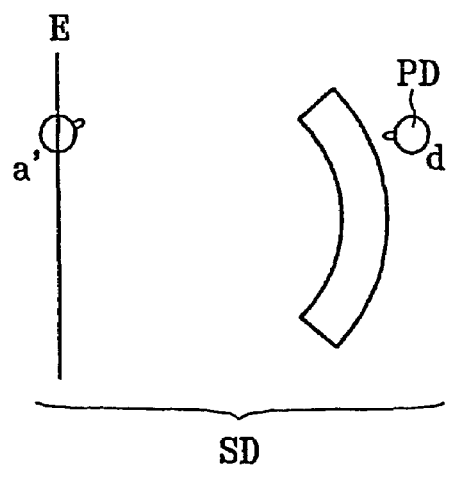

It is this side profile image that is transmitted to the reproduction device located in the remote room SD, which reproduces for d', as show in FIG. 2b, the image a' of a as if a was not looking at d. Eye contact is not reproduced. This is called the parallax effect.

The term image plane is used to describe the plane in which the image of d' is situated. In this example, it is the same as the screen, but this is not always the case as we will se later. The beam ad' is a beam from the local scene to be filmed situated in a plane called the object plane and which is perpendicular to the image plane.

Figure 2C:
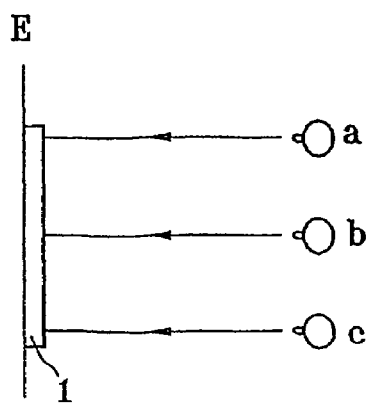

If, as shown in FIG. 2c, the filming is carried out in cylindrical projection mode retained in descriptive geometry, also called Monge geometry or even in industrial drawing, allowing the camera to capture all of the beams parallel to ad', and not in conical projection mode at an angle $\alpha$ as shown in FIG. 2a, then the parallax effect would be eliminated.

The parallax effect has been presented in the context of videoconferencing but we can generalise by considering as a local scene people standing up or by no longer considering a person a but an object, for example a cube whose sides are blue and red and which is positioned at an angle: it has a red side and a blue side facing d'. However, the a1 beam can only come from a blue side, the image a' of the cube will only show the blue side instead of showing the blue and red sides of the cube positioned at an angle.

Furthermore, the size of the participants or the objects during the reproduction varies according to the part of the field in which they are situated, and according to the field angle $\alpha$ of the camera. If several persons or objects are to be filmed, the field needs to be widened but the images reproduced are somewhat curved in that the perspective effects are distorted at the edges of the image; the images reproduced have a variable magnifying effect as illustrated by FIGS. 3a and 3b, which is well known to photographers using wide angle lenses.

Figure 3A:
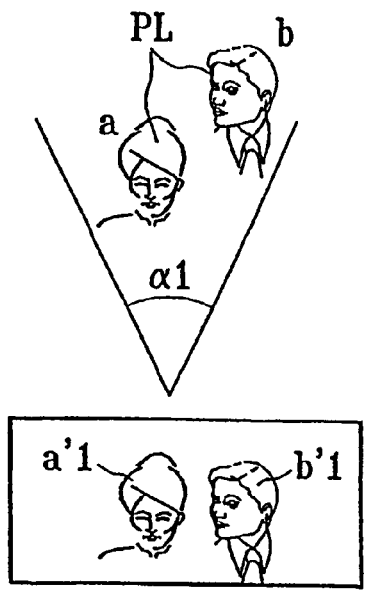
Figure 3B:
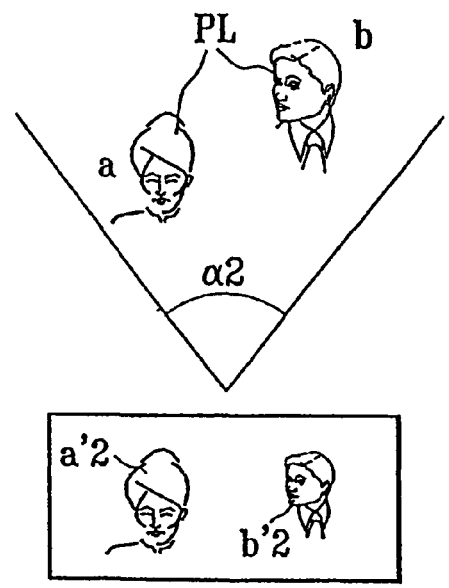

In each of these figures, the two local participants PL, a and b, are represented, one further away than the other, and filmed by a filming device with, in the case of FIG. 3a, a field angle $\alpha 1$ that is narrower than the case $\alpha 2$ of FIG. 3b. The images reproduced a'1 and a'2 of a are very much similar in both cases, but the magnification of b'1 in relation to b (FIG. 3a) is greater than that of b'2 in relation to b (FIG. 3b).

A solution permitting the unwanted effect to be reduced, caused by filming with a wide-angle lens (parallax effect and distorted perspective), consists of limiting the angle $\beta$ formed in one point a of the scene by the beams ad' and a1, represented in FIG. 2a. A specification of the ETSI, European Telecommunications Standards Institute, recommends that this angle $\beta$ does not exceed 8°. This angle is obtained by limiting the scene filmed or by cutting off part of it or by placing the camera close to the line of view, which is detrimental to viewing.

Figure 4A:
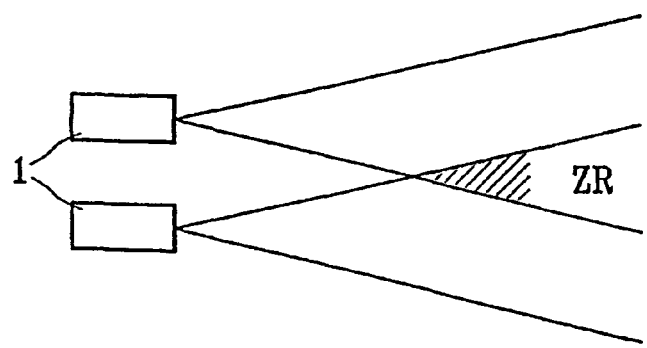
Figure 4B:
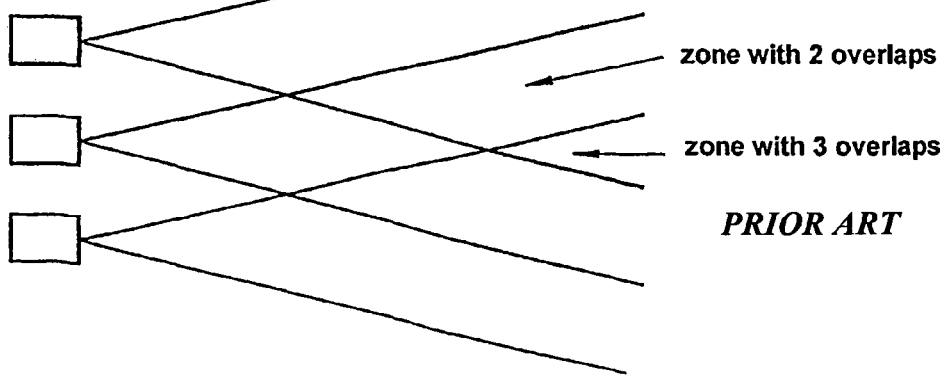

To compensate this disadvantage, several filming devices 1 are available as shown in FIGS. 4a and 4b. In order to ensure the continuity of the filming, these devices, whose optical axes are parallel and in a same plane, are adjacent: several devices 1 are concatenated. However the result is that the film fields have common or overlap zones ZR and that the images reproduced on one or more adjacent reproduction devices each corresponding to a filming device, will have discontinuities arising from the duplicated or overlapped parts. The term viewing overlap the multiple reproduction of the same scene filmed by different cameras whose fields partially overlap.

In the case of two filming devices 1, as shown in FIG. 4a, there will be a zone ZR with two overlaps; in the case of three filming devices 1, as shown in FIG. 4b, there will be zones ZR with two overlaps when close to the filming devices, with three overlaps when further away, etc.

This overlap phenomenon of the views increases when the field angle of the filming devices increases.

Image processing software programmes are being developed at present to overcome this problem but they have not provided satisfactory results as yet.

The invention aims to overcome these problems linked to the parallax effect, the distorted perspective and possibly to the viewing overlap of the current videoconferencing systems by an interactive audiovisual system including a mirror that permits the filming device field angle to be reduced, without limiting the scene.

Figure 5:
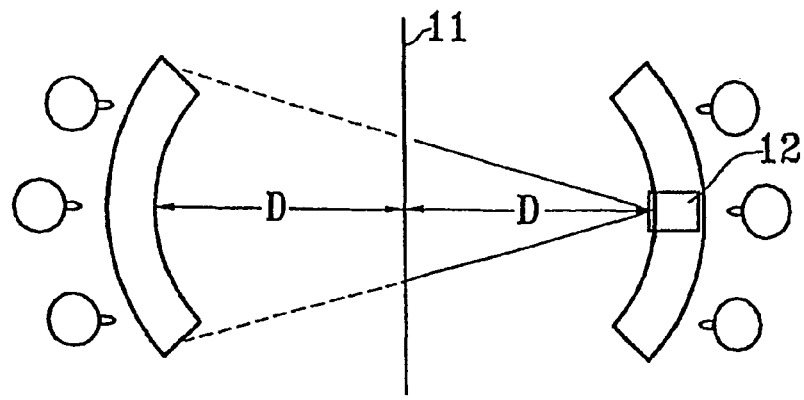

A first approach consists of considering a filming device comprising a mirror 11 and a camera 12 as shown in FIG. 5. The flat mirror 11 is positioned opposite and at a distance D from the scene to be filmed so that the camera 12 films the image of this scene in the mirror 11. The scene to be filmed is the virtual image reflected by the mirror 11. If the mirror 11 is flat, the scene to be filmed is twice the distance (at 2D) from the camera 12, than if the camera 12 was positioned in the place of the mirror 11. Such a mirror therefore permits the scene to be moved further away artificially and therefore to reduce the field angle of the filming device, in this case the camera.

When the unit composed of the mirror 11 and the camera lens 12 is telecentric, the scene to be filmed is almost thrown back to infinity and the reproduced image of the entire (not reduced) scene filmed has virtually none of the faults previously described.

Figure 6:
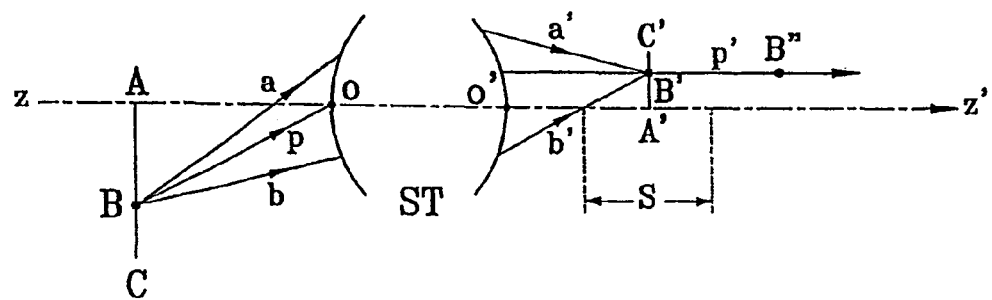

It should be remembered in fact that in a telecentric optical system ST shown in FIG. 6, the principal beams issued from the object AB such as the beam p are, at the output of the ST system, parallel to the optical axis zz' of the said system.

Consequently, the size of the image A'B' of an object AB is independent of the depth of observation; the point B", the image of B along the beam p, is situated at the same distance from the O'z' as B'. The image does not get bigger when an observer moves along the O'z' axis. Of course the observer will only have a clear image on a limited segment S of the O'z' axis situated around B'.

This also means that the size of the image of a lateral object will be respected in the same proportions as the size of an object close to the optical axis of the ST system: for example, the size of the image B'C' of a lateral object BC will be respected in the same proportions as the size of A'B'.

The ST system described is telecentric in the image space, in which the beams are parallel; in the same way, a system may be telecentric in the object space.

Hereafter, the notions of telecentrism and geometry (parallel, perpendicular, focus, etc.) are considered in the accepted limits for systems with tolerances: they include the terms of near-telecentrism, near parallel, near perpendicular, near focus, etc.

The invention concerns an interactive audiovisual system between a local scene and a remote scene, comprising at least one filming device 1 for the local scene and a device 2 for reproducing the image of the remote scene in an image plane I, principally characterised in that the said filming device 1 comprises at least a camera 12 and a mirror 11 capable of reflecting parallel beams from the local scene and perpendicular to the image plane I to the said camera 12.

Preferably, the mirror 11 and the camera 12 form a telecentric unit.

According to one characteristic of the invention, the mirror 11 is concave and has a focus and the camera 12 is situated close to the focus of the said mirror 11, which may be cylindrical, toric or revolution.

According to one characteristic, the reproduction device 2 comprises at least a screen E onto which the image of the remote scene is formed and a semi-transparent mirror 21 capable of forming in the image plane I, the image of the screen E, the said semi-transparent mirror 21 being placed between the mirror 11 of the filming device and the local scene, so that the beams pass through the said semi-transparent mirror 21 and reach the mirror 11 of the filming device.

The semi-transparent mirror 21 may be flat or concave.

According to an additional characteristic, as the semi-transparent mirror 21 is concave, it has a focus and the system comprises among others a projector p situated close to the focus of the said mirror 21, which may be cylindrical, toric or revolution.

According to another characteristic, the reproduction device comprises at least one projector p, projecting the image of the remote scene onto a screen E, the mirror 11 of the filming device being capable of forming the image of the screen E in the image plane I. it may comprise among others a flat mirror 21 situated and orientated so that it reflects the image of the screen E onto the mirror 11 of the filming device.

The projector p may be situated at the focus point of the mirror 11 of the filming device. Similarly, the projector p, screen E and reproduction device mirror 11 unit may form a telecentric unit.

According to another characteristic, the system comprises several filming devices and/or several reproduction devices, that may be aligned or positioned along a convex curve.

The invention also concerns an interactive audiovisual system, between a local scene and a remote scene, comprising at least one filming device for the local scene and a device for reproducing the image of the remote scene in an image plane I, characterised in that the said reproduction device 1 comprises at least one projector p and a screen E on which the image of the remote scene is projected, and a mirror 21 capable of forming the image of the screen E in the image plane I.

Advantageously, the mirror is concave and the mirror 21, the projector p and the screen E form a telecentric unit.

The mirror 21 of the reproduction device may be of the cylindrical, toric or revolution type.

According to one characteristic, the mirror(s) are made of resin covered with a reflective surface.

Figure 7:
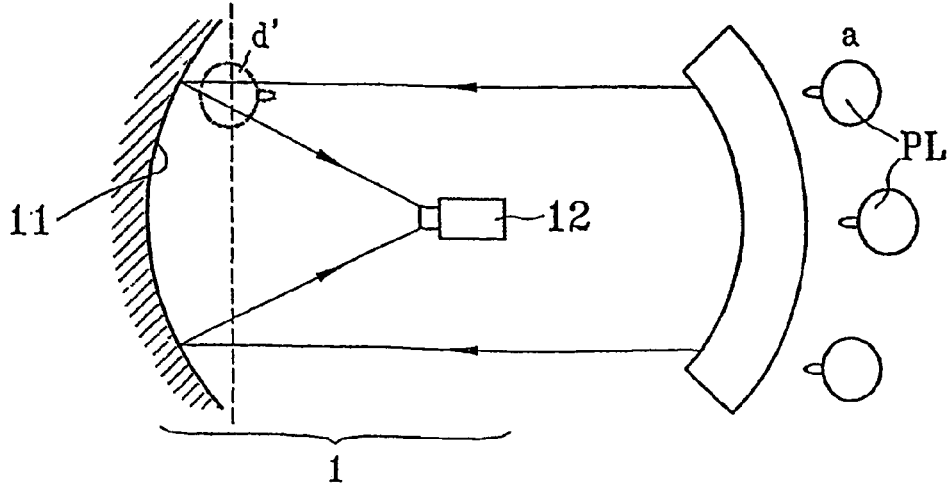
Figure 8:
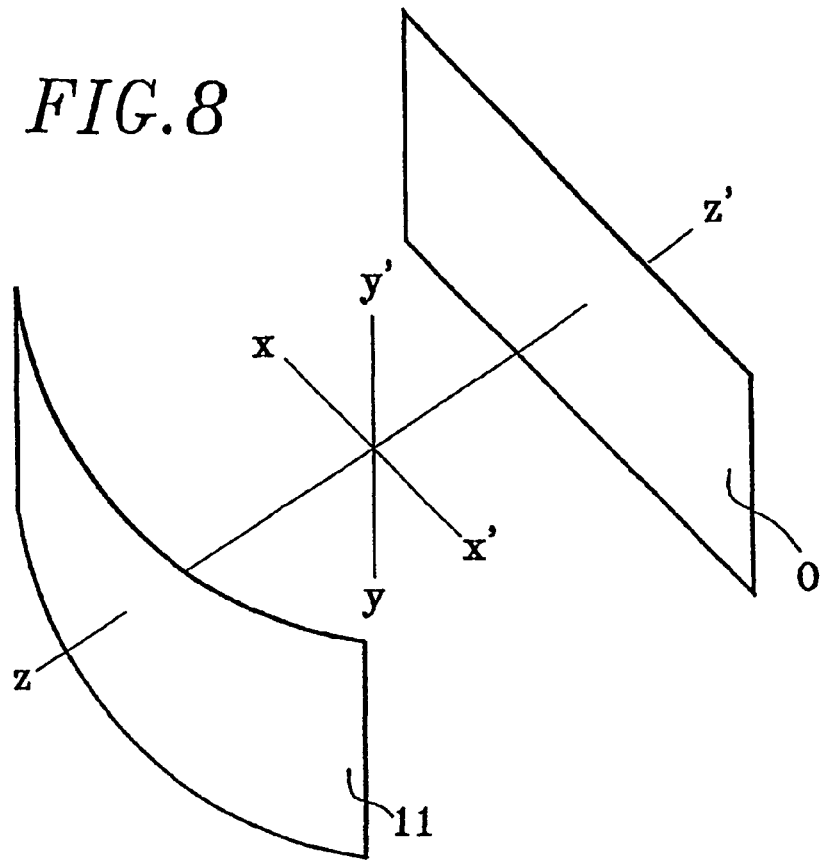
Figure 9A:
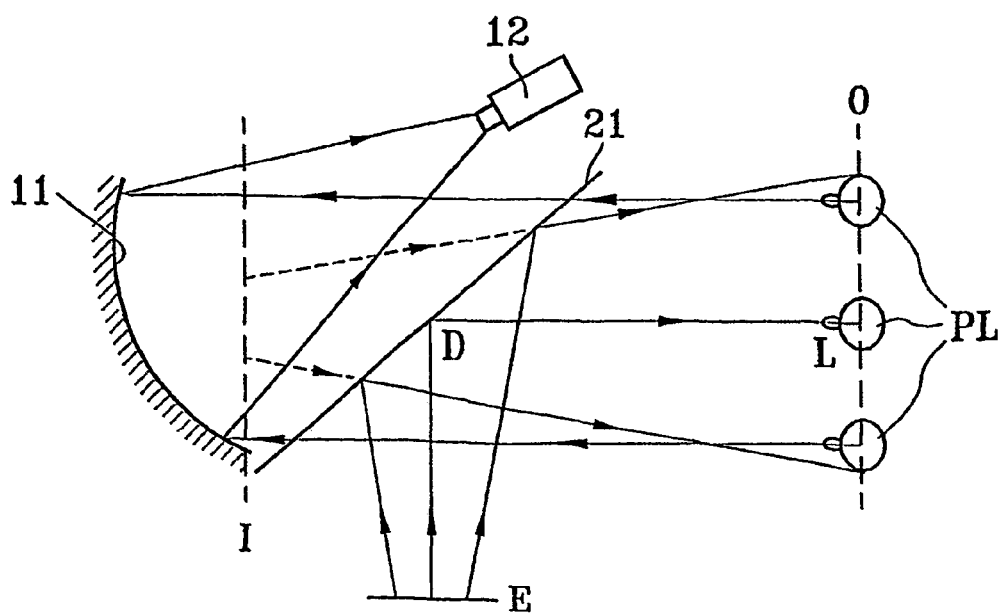
Figure 9B:
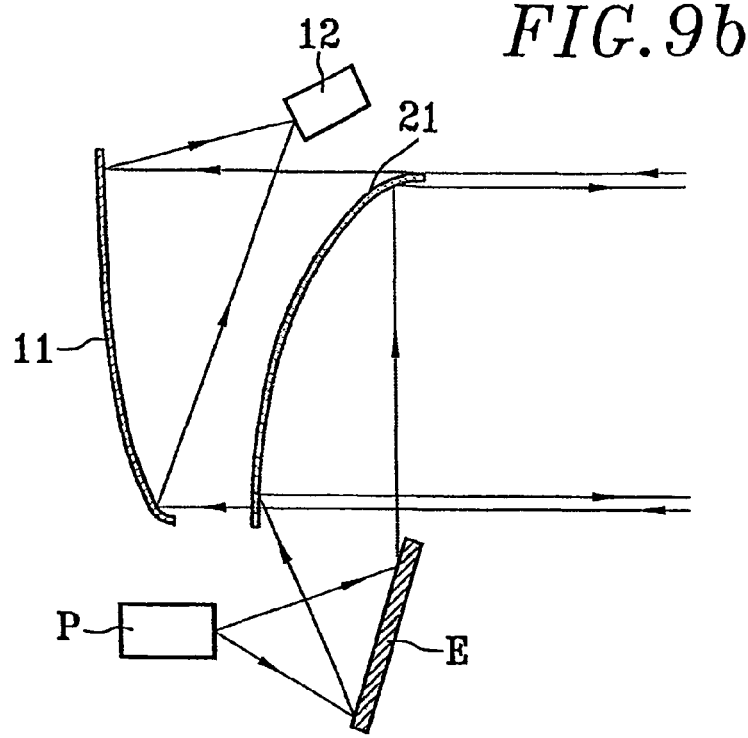
Figure 9C:
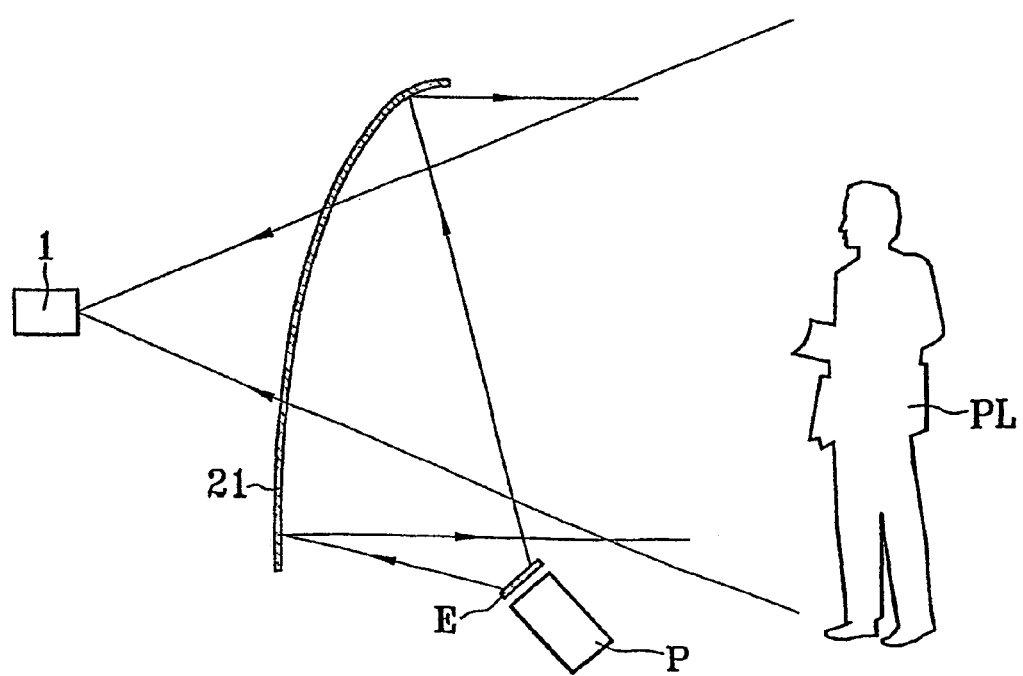
Figure 10:
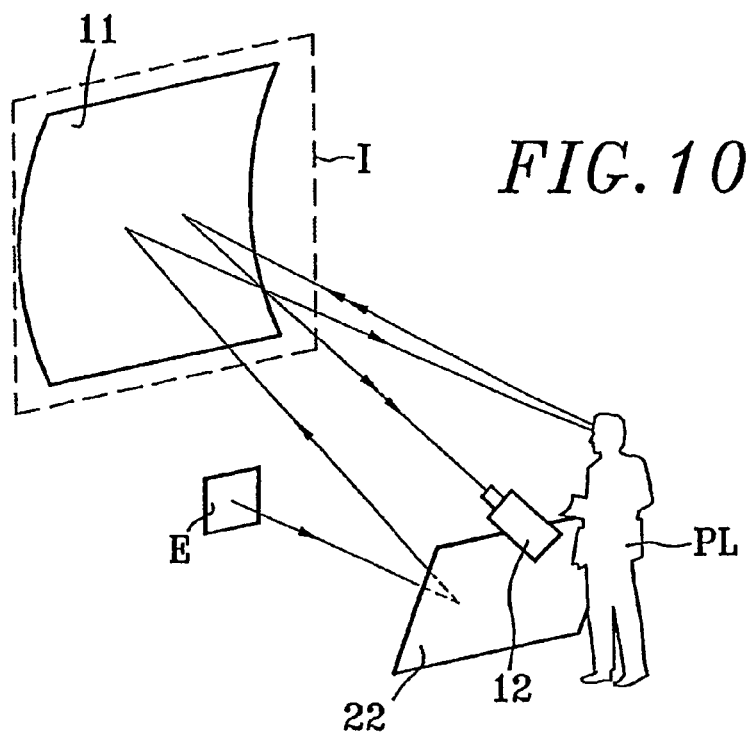
Figure 11:
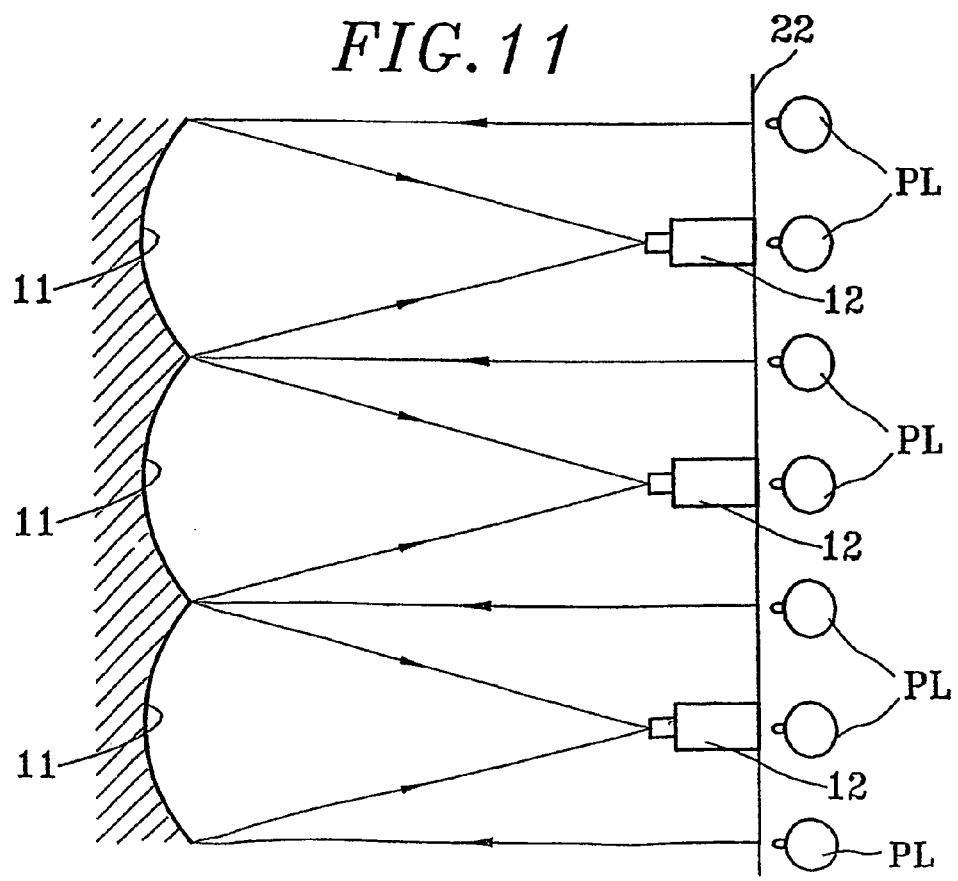
Figure 12:
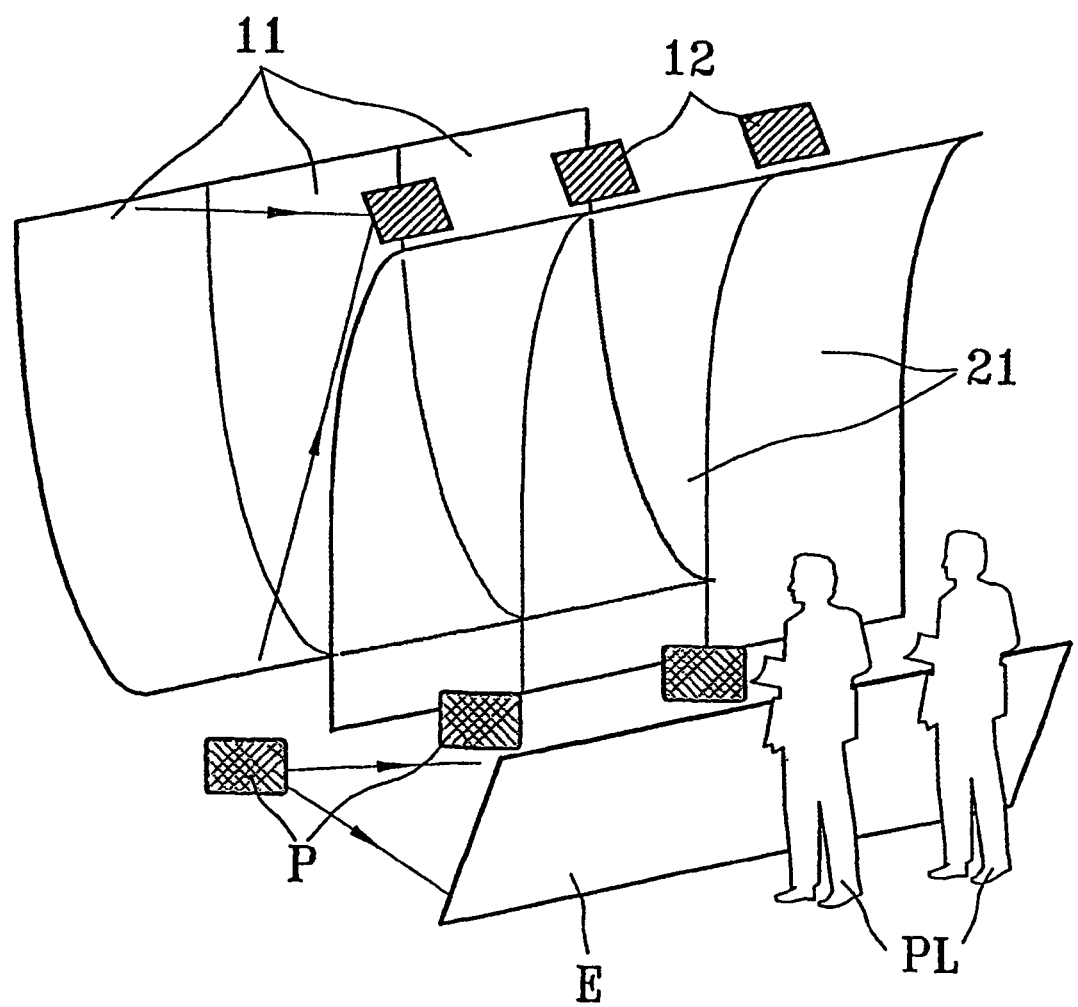

Other specific features and advantages of the invention will become clear upon reading the description given by way of example and which is not restrictive, and with reference to the appended drawings in which:

FIG. 1, already described, is a schematic representation of the chain of elements situated along the journey of an image between a local room and a remote room, FIGS. 2a, 2b and 2c already described illustrate the parallax effect, FIGS. 3a and 3b already described illustrate the magnifying effect of the reproduced image according to the field angle of the filming device, FIGS. 4a and 4b, already described highlight the overlap zones respectively in the case of two and three filming devices, FIG. 5, already described, schematically represents a filming device comprising a flat mirror, FIG. 6, already described, schematically represents a telecentric optical system, FIG. 7, already described, schematically represents a telecentric-filming device according to the invention, FIG. 8, already described, schematically represents a cylindrical mirror which is used to obtain an asymmetrical telecentrism, FIGS. 9a, 9b and 9c schematically represent three embodiments of an interactive audiovisual system according to the invention, the filming and reproduction devices being uncoupled, FIG. 10 schematically represents another embodiment of an interactive audiovisual system according to the invention, the filming and reproduction devices being coupled, FIG. 11 schematically represents several filming devices aligned, FIG. 12 schematically represents several interactive audiovisual systems according to the invention, aligned.

The description is mainly situated in the context of a videoconference with participants benefiting from the telepresence effect, but is not restricted to this specific case of telepresence.

In a first embodiment of the invention, represented in FIG. 7, we consider a telecentric filming device 1 comprising a concave mirror 11 placed opposite the local scene to be filmed, represented in this figure by the participants PL, and a camera 12 capable of filming the image produced by this mirror 11. The lens of the camera can be adjusted to improve the telecentrism.

The mirror is made following a curve with a focus and the camera is situated at the focus point of the concave mirror; the mirror and the camera thus form a telecentric unit. The focus may be situated in the plane of the scene to be filmed.

For simplification, the reproduction device is not shown in FIG. 7, the image plane I is shown in which the local participants PL view the image of the remote scene.

It will be considered hereafter that the plane(s) of the local scene is/are parallel to the image plane I.

Therefore the parallel beams from the local scene to be filmed that are perpendicular to the image plane I, are all reflected by the mirror 11 and converge at its focus point close to which the camera is positioned 12, or more precisely the aperture of the camera lens.

The mirror 11 reflects to the camera 12 the beam composed of all of the parallel beams from the scene to be filmed. The mirror 11 can be replaced by a transparent lens and the camera positioned at the focal point of the lens; however the beam would no longer be reflected and the filming device would be too bulky.

In the case of FIG. 7, the beam ad' which corresponds to the look of a towards d, which in the case of FIG. 2a was cut off from the camera field, will be included by the camera 12, in compliance with the properties of this telecentric filming device 1.

As shown in FIG. 8, the telecentrism obtained may be asymmetrical, by using a mirror 11 composed of a portion of a cylinder along an axis yy'. The cylinder may be circular or made to follow another curve with a focus point. The image obtained may be anamorphosed for specific applications.

In this figure, the scene to be filmed is represented in an object plane O parallel to the plane xx', yy'. Even though it is represented by this plane O, the scene to be filmed may have a depth along the zz' axis and thus be composed of several planes O.

A toric mirror may also be used, with different curve radii along the xx' and yy' axes; the cylindrical type mirror described above is a specific case of a toric mirror, whose curve radius is infinite along the yy' axis.

A revolution (spherical, parabolic, or other) type mirror may also be used, to obtain a revolution telecentrism.

FIGS. 9a and 9b show an interactive audiovisual system according to the invention, comprising a telecentric filming device and a reproduction device, operating separately.

The filming device comprises a concave and angled mirror 11, which is to say that the axis between the mirror 11 and its focus is not the same as perpendicular LD of the O plane of the scene to be filmed, and a camera 12 situated close to the focus of the mirror 11. Close to the focus is defined as a small zone comprising this focus and the area around it. The mirror 11 and the camera 12 form a telecentric unit: the camera 12 films the local scene in telecentric mode, reflecting on the mirror 11.

In FIG. 9a, the reproduction device 2 comprises a projector (not shown) and a screen E in which the image of the emote scene is formed: the screen E is not opposite the participants PL. For example, it may be situated in a plane perpendicular to the plane O of the scene to be filmed. The device 2 also comprises a flat semi-transparent mirror 21 which permits the image of the screen E to be reflected to the image plane I, destined to the local participants PL. The image plane I where the image of the screen is formed by the flat semi-transparent mirror 21 does not coincide with the plane of the screen E. The flat mirror 21 is orientated so that the I plane is parallel to the O plane. For example, it is orientated at 45°.

The flat semi-transparent mirror 21 also allows the beams from the scene to be filmed perpendicular to the image plane I to pas to the mirror.

In FIG. 9b, the reproduction device 2 comprises a projector P and a screen E onto which the image of the remote scene is projected; the screen E is not opposite the local participants PL. The device 2 comprises a semi-transparent cylindrical mirror 21 that allows the image of the screen E to be reflected onto the image plane I, destined to the local participants PL. The mirror is orientated so that the I planer is parallel to the O plane.

Due to its cylindrical form, the mirror 21 enlarges the screen image to make it the desired virtual size. It enlarges it in the tangential direction; in the generator direction, it acts as a flat mirror. The cylindrical mirror 21 may also be used as for optical correction of the camera, by correcting in particular aperture anomalies like a Schmitt blade on a telescope.

The semi-transparent mirror 21 also allows the beams from the scene to be filmed perpendicular to the I image plane to pass.

For example, we can consider for the semi-transparent mirrors 21 of FIGS. 9a) and 9b), a transmission coefficient of 30% and a reflection coefficient of 70% favouring the luminosity of the image observed by the local participants. The camera 12 is sufficiently sensitive to remain efficient with a beam attenuated by 70%.

According to these embodiments, as represented in FIGS. 9a) and 9b), the filming and reproduction are uncoupled. The filming is telecentric.

When as shown in FIG. 9b, the mirror 21, screen and projector P unit return to the local participants the reproduced image of the remote scene in a parallel beam, this is then telecentric; the reproduction device is then also telecentric. When the beam is not parallel as represented in FIG. 9a), then the reproduction is not telecentric.

When the screen is flat, it does not contribute to the telecentrism of the reproduction device. When the screen is concave, the telecentrism is then obtained by the screen, mirror and projector unit;

furthermore, if at the origin of the reproduced image formed on the screen E, the filming has been shot with a telecentric device, then the scene filmed will not have the defects linked to the parallax effect, distorted perspective, etc. nor the reproduced image of this scene. However, if at the origin of the image reproduced the filming has not been shot with a telecentric device, then the filmed scene may have the said defects which will also appear in the image reproduced on the screen.

According to another embodiment of the invention, represented in FIG. 9c), the filming and reproduction devices are uncoupled, but only the reproduction device is telecentric.

The acquisition device 1, comparable to that of FIG. 2a), is not telecentric. the reproduction device is composed of a projector p, a screen E and a semi-transparent cylindrical mirror 21, with the projector p being situated close to the focus of the mirror 21: the reproduction device is telecentric.

FIG. 10 shows another embodiment of an interactive audiovisual system of the invention, where the filming and reproduction are coupled.

The filming device comprises a concave mirror 11 disposing of a focus and a camera 12 situated close to this focus where the beams from the scene to be filmed and perpendicular to the image plane I converge, and where they are reflected back by the mirror 11 as described for FIG. 7. The camera may be situated in the plane of the scene to be filmed. The path of these beams is shown by a line with two arrows.

The reproduction device comprises a projector (not shown), a screen E onto which the image of the remote scene is projected and a flat mirror 22 receiving the image of the screen E.

The screen E may be a cardboard screen, a cathode or a plasma screen, etc. The mirror 22 is angled so that it reflects the image of the screen E onto the concave mirror 11 destined to the local participants PL. The path of the image from the screen E to the local participant PL is shown by a line with an arrow.

The mirror 22 may be removed and replaced by the screen E.

In this embodiment, the mirror 11 is used both by the filming device and by the reproduction device. The filming device, composed of the mirror 11 and the camera 12 situated at the mirror focus 11 is telecentric.

The reproduction device is composed of a mirror 11, the screen E and the projector p. Depending on whether the projector p is situated at the focus of the mirror 11, (or at the focus of the mirror 11 and screen E unit), the reproduction unit is telecentric or not.

Several telecentric filming devices may be aligned next to one another as shown in FIG. 11, thus ensuring the continuity of the scene being filmed. The filming devices may be contiguous or not.

Each filming device films a portion of the local scene. The view overlap phenomenon as shown in FIGS. 4a) and 4b) is considerably reduced as the beams captured by the cameras 12 come from beams that are parallel to one another, or virtually parallel according to the telecentrism tolerances allowed by the system, which was not the case for the filming devices of FIGS. 4a) and 4b). The overlap zones will be virtually non-existent. The images reproduction by the reproduction devices that may be aligned, a reproduction device corresponding to a filming device for example, will have virtually no more discontinuity between them. It is not necessary to have as many reproduction devices as filming devices.

The images filmed by the cameras may be concatenated before reproduction, preferably by an image processing software programme, so as to form a single image to be reproduced. This image may even by split onto several screens next to one another.

The filming devices and/or the reproduction devices may also be positioned in a convex curve layout, for example in a half-circle.

Several interactive audiovisual systems such as that represented in FIG. 9b may be aligned as represented in FIG. 12. Each telecentric filming device (camera 12 and mirror 11) films a portion of the local scene and the local participants can observe the remote scene continuously reproduced from one reproduction device (screen E and semi-transparent mirror 21) to another.

Such interactive audiovisual systems of the invention may be used in other contexts than that of the videoconference.

The number of systems may be increased in diverse configurations so as to form a kiosk or a telepresence wall in a hall, a street, etc. linked virtually on a permanent basis to another remote kiosk or telepresence wall. It is no longer necessary to reserve the service as is often the case at present for videoconference systems.

A person passing in front of a telepresence wall located in Paris for example can communicate privately or informally with another person in front of a remote telepresence wall located in Nantes for example, connected to the one in Paris, as if they had met in the street, ion a corridor, etc. These remote people can walk "side by side" for example.

The mirrors may be made of resin covered with a reflective surface, possibly made of plastic.

The invention claimed is:

1. An interactive audiovisual system between a local scene and a remote scene, comprising filming means for filming the local scene and a reproduction device for reproducing the image of the remote scene in an image plane, wherein said filming means comprises several filming devices aligned side by side, wherein each filming device comprises at least a camera and a mirror capable of reflecting parallel beams from the local scene and perpendicular to the image plane to said camera by a single reflection, and wherein said mirror and said camera form a telecentric unit.

2. The interactive audiovisual system according to claim 1, wherein said mirror is concave and has a focus, and wherein said camera is positioned close to said mirror.

3. The interactive audiovisual system according to claim 2, wherein the mirror of each filming device is a cylindrical, toric or revolution mirror.

4. The interactive audiovisual system according to claim 1, wherein the reproduction device comprises at least a screen onto which the image of the remote scene is formed and a semi-transparent mirror capable of forming in the image plane, the image of the screen, said semi-transparent mirror being placed between the mirror of the filming device and the local scene, so that the beams pass through said semi-transparent mirror and reach the mirror of the filming device.

5. The interactive audiovisual system according to claim 4, wherein the semi-transparent mirror is flat or concave.

6. The interactive audiovisual system according to claim 5, wherein the semi-transparent mirror is concave, wherein said mirror has a focus, and wherein said system comprises among others a projector situated close to the focus of said mirror.

7. The interactive audiovisual system according to claim 6, wherein the mirror is cylindrical, toric or revolution.

8. The interactive audiovisual system according to claim 1, wherein the reproduction device comprises at least one projector, projecting the image of the remote scene onto a screen, the mirror of the filming device being capable of forming the image of the screen in the image plane.

9. The interactive audiovisual system according to claim 8, comprising a flat mirror situated and orientated so as to reflect the image of the screen onto the mirror of the filming device.

10. The interactive audiovisual system according to claim 8, wherein the projector is situated at the focus point of the mirror of the filming device.

11. The interactive audiovisual system according to claim 8, wherein the projector, the screen and the reproduction device mirror unit form a telecentric unit.

12. The interactive audiovisual system according to claim 1, comprising several reproduction devices.

13. The interactive audiovisual system according to claim 12, wherein said reproduction devices are mutually aligned and wherein each reproduction device comprises at least one projector and a screen onto which the image of the remote scene is projected, and a mirror capable of forming the image of the screen in the image plane.

14. The interactive audiovisual system according to claim 13, wherein said mirror is concave and wherein the mirror, the projector and the screen form a telecentric unit.

15. The interactive audiovisual system according to claim 13, wherein the mirror of the reproduction device is of the cylindrical, toric or revolution type.

16. The interactive audiovisual system according to claim 13, wherein the mirror(s) are made of resin covered with a reflective surface.

* * * * *